United States Patent
Hosono

(10) Patent No.: US 10,649,197 B2
(45) Date of Patent: May 12, 2020

(54) MAGNIFIED OBSERVATION APPARATUS

(71) Applicant: OLYMPUS CORPORATION, Tokyo (JP)

(72) Inventor: Shodai Hosono, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/428,205

(22) Filed: May 31, 2019

(65) Prior Publication Data

US 2020/0004005 A1    Jan. 2, 2020

(30) Foreign Application Priority Data

Jun. 28, 2018  (JP) ................................ 2018-123329

(51) Int. Cl.
| | |
|---|---|
| G02B 21/36 | (2006.01) |
| G02B 21/06 | (2006.01) |
| G02B 21/26 | (2006.01) |
| G02B 21/02 | (2006.01) |

(52) U.S. Cl.
CPC .......... *G02B 21/365* (2013.01); *G02B 21/06* (2013.01); *G02B 21/368* (2013.01); *G02B 21/02* (2013.01); *G02B 21/26* (2013.01)

(58) Field of Classification Search
CPC .............................. G02B 21/365; G02B 21/06
USPC ........................................................... 348/79
See application file for complete search history.

(56) References Cited

U.S. PATENT DOCUMENTS

2018/0284412 A1*  10/2018  Murata ................... G02B 21/12

FOREIGN PATENT DOCUMENTS

JP         2001-242385 A        9/2001

* cited by examiner

*Primary Examiner* — Jeffrey A Williams
(74) *Attorney, Agent, or Firm* — Scully, Scott, Murphy & Presser, P.C.

(57) ABSTRACT

A magnified observation apparatus includes: an observation unit including a light source and an imaging unit; a light quantity parameter table recording unit configured to store plural light quantity parameter tables therein, each of the plural light quantity parameter tables including: a minimum value and a maximum value of light quantity of illumination light; and a unit manipulation amount obtained by division of an interval between the minimum value and the maximum value by a predetermined division number, maximum values in the plural light quantity parameter tables being different from one another; a light quantity parameter selecting unit configured to select one light quantity parameter table from the plural light quantity parameter tables; and a light source control unit configured to increase or decreases light quantity of the illumination light, correspondingly to magnitude of the unit manipulation amount in the selected light quantity parameter table.

6 Claims, 7 Drawing Sheets

MAGNIFIED OBSERVATION APPARATUS

CROSS REFERENCES TO RELATED APPLICATIONS

This application is based upon and claims the benefit of priority from Japanese Patent Application No. 2018-123329, filed on Jun. 28, 2018, the entire contents of which are incorporated herein by reference.

BACKGROUND

1. Technical Field

The present disclosure relates to a magnified observation apparatus.

2. Related Art

Known in the related art as a magnified observation apparatus for magnified observation of a specimen is a microscope including an observation unit including: a light source that irradiates the specimen with illumination light; and an imaging unit that forms an image of reflected light from the specimen (see, for example, Japanese Laid-open Patent Publication No. 2001-242385). With microscopes, specimens may be observed by various observation methods, such as bright field microscopy, dark field microscopy, MIX observation, differential interference contrast microscopy, polarized light microscopy, and oblique microscopy. Furthermore, even if the same observation method is used, any of various optical elements, such as filters, may be inserted into or removed from the optical path.

When the observation method is changed, or an optical element is inserted or removed, the brightness of the specimen being displayed on a display unit is changed, and thus the light quantity of illumination light emitted from the light source to the specimen needs to be adjusted. Disclosed in Patent Literature 1 is a microscope where the quantity of light is automatically changed when the switch is changed according to the observation method. In this microscope, the quantity of light is able to be adjusted manually after the quantity of light is changed according to the switch.

SUMMARY

In some embodiments, a magnified observation apparatus includes: an observation unit including: a light source configured to irradiate a specimen with illumination light; and an imaging unit configured to form an image of reflected light from the specimen; a light quantity parameter table recording unit configured to store plural light quantity parameter tables therein, each of the plural light quantity parameter tables including: a minimum value and a maximum value of light quantity of the illumination light; and a unit manipulation amount obtained by division of an interval between the minimum value and the maximum value by a predetermined division number, maximum values in the plural light quantity parameter tables being different from one another; a light quantity parameter selecting unit configured to select one light quantity parameter table from the plural light quantity parameter tables; and a light source control unit configured to increase or decreases light quantity of the illumination light, correspondingly to magnitude of the unit manipulation amount in the light quantity parameter table selected by the light quantity parameter selecting unit, according to input of an instruction by an operator.

In some embodiments, a magnified observation apparatus includes: a light source configured to irradiate a specimen with illumination light; an image sensor configured to form an image of reflected light from the specimen; a memory configured to store plural light quantity parameter tables therein, each of the plural light quantity parameter tables including: a minimum value and a maximum value of light quantity of the illumination light; and a unit manipulation amount obtained by division of an interval between the minimum value and the maximum value by a predetermined division number, maximum values in the plural light quantity parameter tables being different from one another; and a processor including hardware. The processor is configured to select one light quantity parameter table from the plural light quantity parameter tables, and increase or decrease the light quantity of the illumination light, correspondingly to magnitude of the unit manipulation amount in the selected light quantity parameter table, according to input of an instruction by an operator.

The above and other features, advantages and technical and industrial significance of this disclosure will be better understood by reading the following detailed description of presently preferred embodiments of the disclosure, when considered in connection with the accompanying drawings.

DETAILED DESCRIPTION

Hereinafter, embodiments will be described.

First Embodiment

Figure 1:
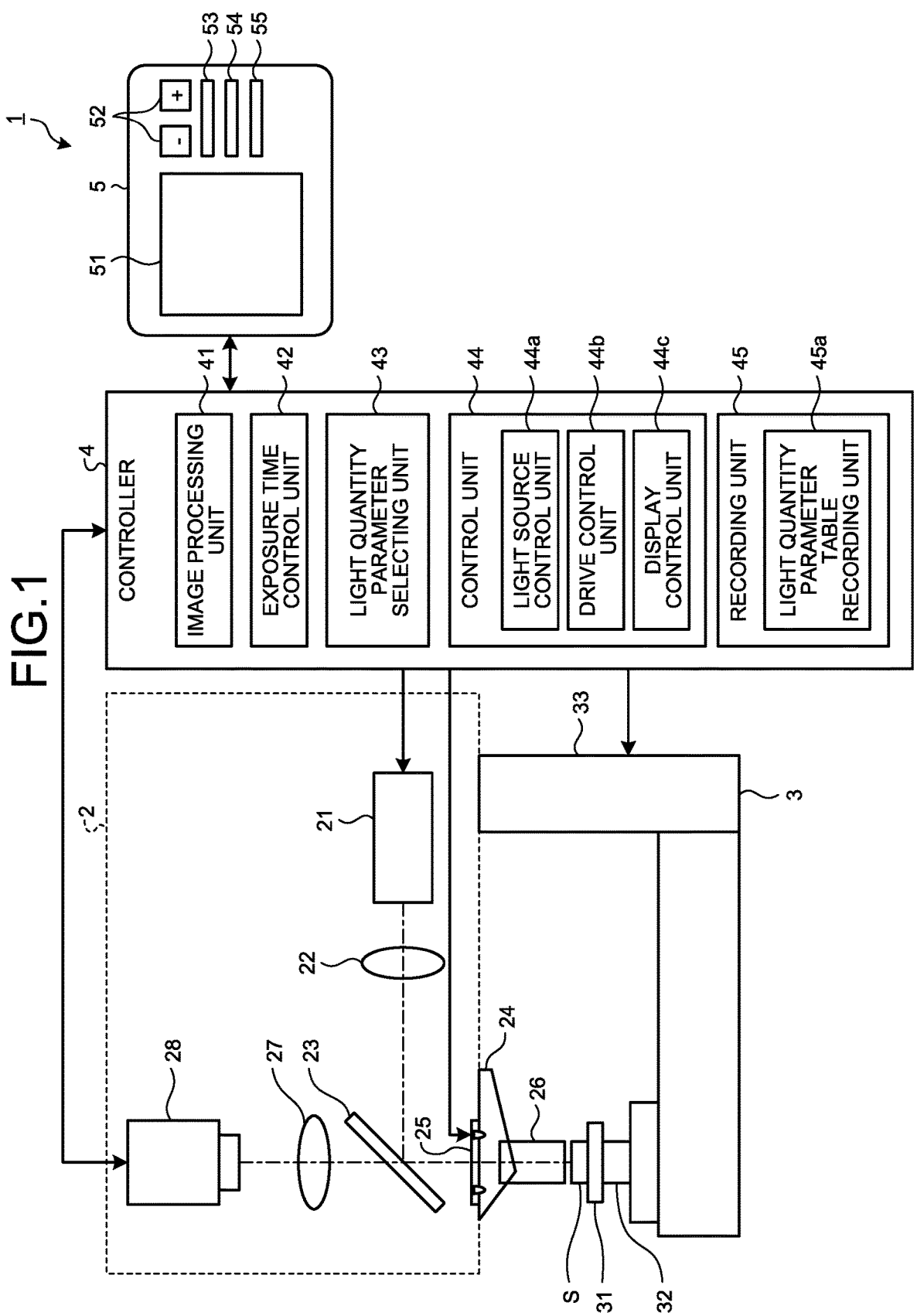
FIG. 1 is a block diagram schematically illustrating a functional configuration of a microscope according to a first embodiment.

FIG. 1 is a block diagram schematically illustrating a functional configuration of a microscope according to a first embodiment. With respect to FIG. 1, a plane that is where a microscope 1 is placed and orthogonal to the optical axis of illumination light will be referred to as an XY-plane and a direction along the optical axis will be referred to as a Z-direction.

The microscope 1 illustrated in FIG. 1 and serving as a magnified observation apparatus includes: an observation unit 2 that captures an image of a specimen S; a stage unit 3 where the specimen S is placed; a controller 4 that integrally controls the whole microscope 1; and a display unit 5 that displays thereon the image captured by the observation unit 2.

The observation unit 2 includes a bright field light source 21, an illumination lens 22, a half mirror 23, a revolver 24, a dark field light source 25, an objective lens 26, a tube lens 27, and an imaging unit 28.

The bright field light source 21 is a light source mainly used when bright field microscopy is performed, and irradiates the specimen S with illumination light under control by the controller 4. The bright field light source 21 may include one or more of various white light sources, such as a white light emitting diode (LED), a halogen lamp, and a xenon lamp.

The illumination lens 22 condenses illumination light emitted from the bright field light source 21 into substantially parallel light.

The half mirror 23 reflects illumination light to the objective lens 26, and transmits therethrough reflected light reflected by the specimen S, transmitted through the objective lens 26, and incident thereon.

The revolver 24 is rotatably provided relatively to the observation unit 2, and switchably places any one of objective lens to be used in observation of the specimen S onto the optical axis of illumination light. However, a configuration where the objective lenses are manually switched over at the time of observation may also be adopted.

The dark field light source 25 is a light source mainly used when dark field microscopy is performed, and irradiates the specimen S with illumination light under control by the controller 4. The dark field light source 25 includes plural white LEDs arranged circularly around the objective lens 26.

The objective lens 26 condenses illumination light emitted by the bright field light source 21, onto the specimen S.

The tube lens 27 condenses the reflected light from the specimen S, the reflected light having been transmitted through the half mirror 23 and incident thereon, and forms an observation image.

The imaging unit 28 forms an image of the reflected light from the specimen S. Specifically, by receiving the observation image formed by the tube lens 27 and performing photoelectric conversion thereon, the imaging unit 28 generates image data of the specimen S and outputs the image data to the controller 4. The imaging unit 28 is configured by use of a charge coupled device (CCD) or a complementary metal oxide semiconductor (CMOS).

The observation unit 2 may be configured to enable observation by an observation method other than bright field microscopy and dark field microscopy. For example, the observation unit 2 enables observation by one or more of: MIX microscopy that is a combination of bright field microscopy and dark field microscopy; differential interference contrast microscopy using a differential interference contrast (DIC) prism; polarized light microscopy using a polarizer having a crossed-Nicols arrangement; and oblique microscopy where illumination light is emitted obliquely to a specimen.

The stage unit 3 includes an XY-stage 31, a Z-stage 32, and a frame 33.

The XY-stage 31 moves the specimen S in a plane orthogonal to the optical axis of illumination light.

The Z-stage 32 aims the objective lens 26 to the specimen S by moving the specimen S, which has been placed thereon via the XY-stage 31, in a direction along the optical axis.

The frame 33 includes the XY-stage 31 and the Z-stage 32 placed thereon, and holds the observation unit 2.

The controller 4 is configured by use of a central processing unit (CPU) and a memory, and integrally controls operation of the microscope 1 by transmitting control signals and various data to the respective units forming the microscope 1.

The controller 4 includes an image processing unit 41, an exposure time control unit 42, a light quantity parameter selecting unit 43, a control unit 44, and a recording unit 45.

The image processing unit 41 performs predetermined image processing on image data sequentially input from the imaging unit 28, and sequentially outputs the image data that have been subjected to the image processing, to the display unit 5. Specifically, the image processing unit 41 performs image processing, such as optical black reduction processing, white balance adjustment processing, color matrix operation processing, gamma correction processing, color reproduction processing, and edge enhancement processing, on the image data, and outputs the image-processed image data to the display unit 5.

The exposure time control unit 42 controls the exposure time of the imaging unit 28. The exposure time control unit 42 controls the exposure time, such that the larger the light quantity of illumination light emitted by the bright field light source 21 or dark field light source 25 to the specimen S is, the more the exposure time is shortened. However, the exposure time has a minimum value and a maximum value defined therefor, and the exposure time control unit 42 controls the exposure time to be in a range between the minimum value and the maximum value.

The light quantity parameter selecting unit 43 selects one light quantity parameter table from plural light quantity parameter tables. Specifically, the light quantity parameter selecting unit 43 selects and reads one light quantity parameter table from a light quantity parameter table recording unit 45a described later.

The control unit 44 includes a light source control unit 44a, a drive control unit 44b, and a display control unit 44c.

The light source control unit 44a controls the light quantity of illumination light emitted by the bright field light source 21 and the dark field light source 25 to the specimen S. According to input of an instruction by an operator, the light source control unit 44a increases or decreases the light quantity of the illumination light, correspondingly to the magnitude of a later described unit manipulation amount in the light quantity parameter table selected by the light quantity parameter selecting unit 43.

The drive control unit 44b controls driving of the XY-stage 31 and the Z-stage 32. Specifically, the drive control unit 44b controls driving of the XY-stage 31 and the Z-stage 32 by outputting predetermined amounts of pulses to motors included in the XY-stage 31 and the Z-stage 32.

The display control unit 44c controls the mode of display by the display unit 5.

The recording unit 45 stores various programs for operating the microscope 1, various data used when the programs are being executed, and image data generated by the imaging unit 28 therein. The recording unit 45 is configured by use of a volatile memory and a non-volatile memory. Furthermore, the recording unit 45 includes the light quantity parameter table recording unit 45a.

A light quantity parameter table is a table of parameters referred to when an operator performs manipulation for increasing and decreasing the light quantity of illumination light. The light quantity parameter table includes a minimum value and a maximum value of light quantity of illumination light, and a unit manipulation amount obtained by division of an interval between the minimum value and the maximum value by a predetermined division number. The light quantity parameter table recording unit 45a stores therein plural light quantity parameter tables having different maximum values.

Figure 2:
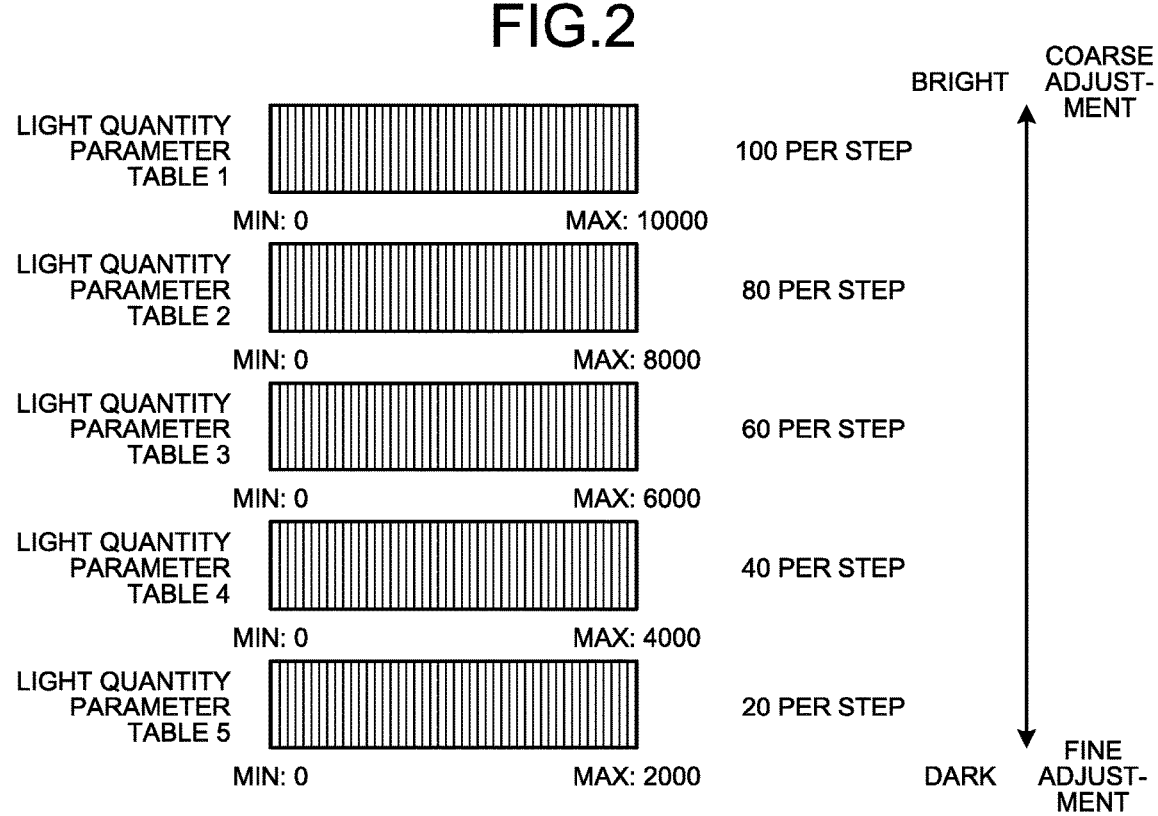
FIG. 2 is a diagram illustrating light quantity parameter tables recorded in a light quantity parameter table recording unit.

FIG. 2 is a diagram illustrating light quantity parameter tables recorded in the light quantity parameter table recording unit 45a. As illustrated in FIG. 2, for example, the light quantity parameter table recording unit 45a has, recorded therein, five light quantity parameter tables 1 to 5. The light quantity parameter table 1 has a maximum value (MAX) of 10000 and a minimum value (MIN) of 0 for the quantity of light. Because this interval is divided by a predetermined division number (for example, 100), the quantity of light is increased or decreased by 100 per step corresponding to a unit manipulation amount. Similarly, the light quantity parameter table 2 has a maximum value (MAX) of 8000 and a minimum value (MIN) of 0 for the quantity of light, and because this interval is divided by a predetermined division number, the quantity of light is increased or decreased by 80 per step corresponding to a unit manipulation amount. The light quantity parameter tables 3, 4, and 5 similarly have maximum values (MAX) of 6000, 4000, and 2000 respectively for the quantity of light, and the quantity of light is increased or decreased by 60, 40, or 20 respectively per step corresponding to a unit manipulation amount therein.

The display unit 5 displays thereon an image corresponding to image data acquired by imaging of the specimen S by the imaging unit 28. Specifically, the display unit 5 displays thereon an image corresponding to image data input via the controller 4, and manipulation information of the microscope 1. The display unit 5 is configured by use of a display panel made of liquid crystal or organic electro-luminescence (EL). The display unit 5 has, displayed thereon, an image display section 51, a light quantity adjusting button 52, a light quantity display section 53, an exposure time display section 54, and a light quantity parameter table selecting section 55.

Figure 3:
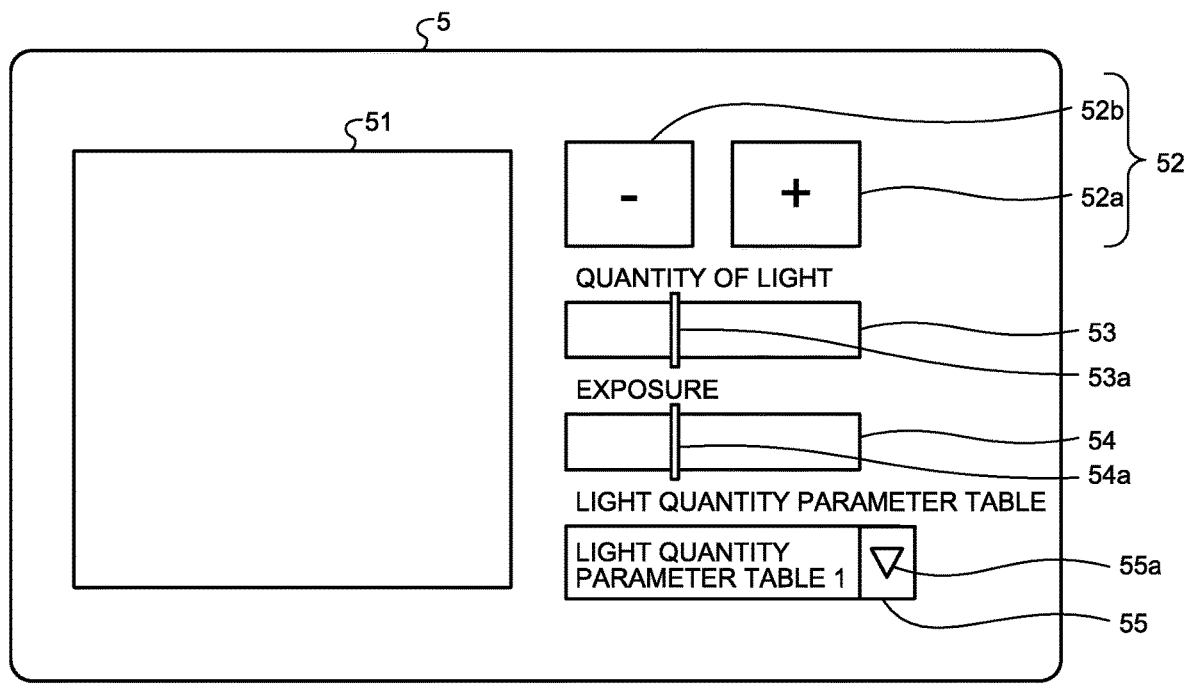
FIG. 3 is a diagram illustrating an example of a screen displayed on a display unit.

FIG. 3 is a diagram illustrating an example of a screen displayed on the display unit 5. The image display section 51 illustrated in FIG. 3 has, displayed thereon, an image of the specimen S captured by the imaging unit 28.

The light quantity adjusting button 52 includes a light quantity increasing button 52a that receives input of an instruction to increase the light quantity of illumination light according to the magnitude of a unit manipulation amount, and a light quantity decreasing button 52b that receives input of an instruction to decrease the light quantity of illumination light according to the magnitude of the unit manipulation amount.

The light quantity display section 53 includes a light quantity display line 53a that indicates the current quantity of light on a light quantity bar representing quantity of light. The more rightward on the light quantity bar the light quantity display line 53a is positioned, the larger the quantity of light is indicated to be.

The exposure time display section 54 includes an exposure time display line 54a that indicates the current exposure time on an exposure time bar representing exposure time. The more rightward on the exposure time bar the exposure time display line 54a is positioned, the longer the exposure time is indicated to be.

The light quantity parameter table selecting section 55 includes a light quantity parameter table selecting button 55a that receives input of an instruction to select a light quantity parameter table from an operator. When the light quantity parameter table selecting button 55a is pressed down, the light quantity parameter tables 1 to 5 are displayed on the display unit 5. The operator selects a desired light quantity parameter table from the light quantity parameter tables 1 to 5 displayed thereon. Thereafter, the selected light quantity parameter table is displayed in the light quantity parameter table selecting section 55.

Figure 4:
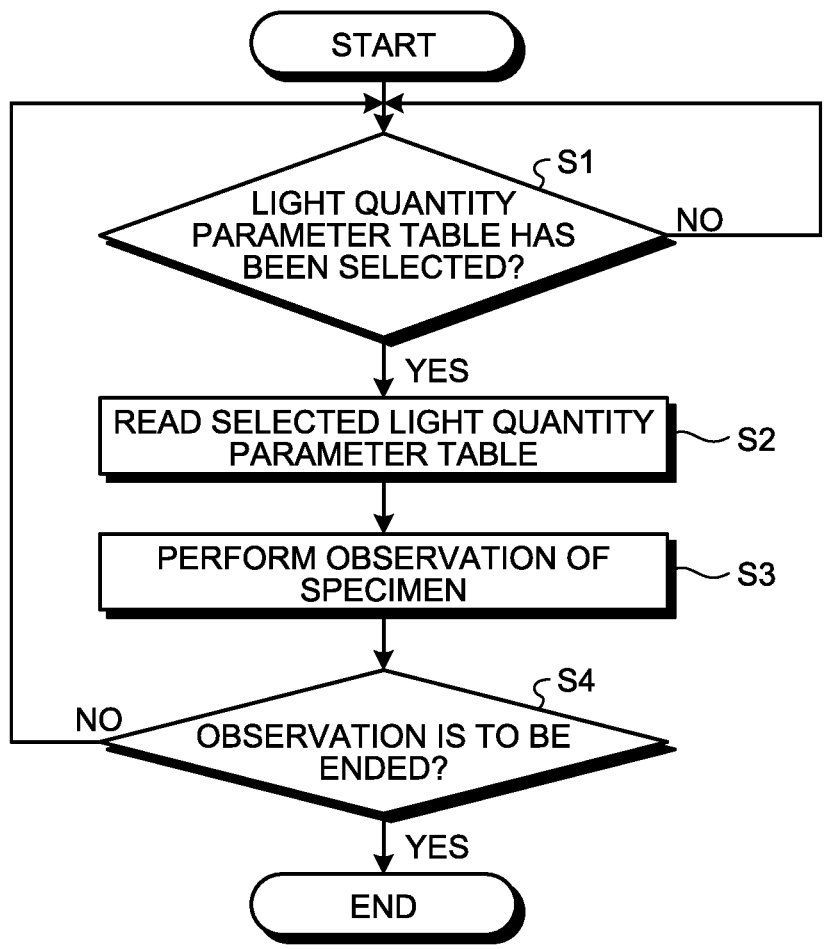
FIG. 4 is a flow chart illustrating an outline of processing upon observation of a specimen.

The following is a description on the procedure for observation of the specimen S by use of the microscope 1. FIG. 4 is a flow chart illustrating an outline of processing upon observation of a specimen. As illustrated in FIG. 4, the control unit 44 determines whether or not a light quantity parameter table has been selected (Step S1). Specifically, the control unit 44 determines whether or not a light quantity parameter table has been selected by the operator pressing down the light quantity parameter table selecting button 55a.

If the control unit 44 determines that a light quantity parameter table has been selected (Step S1; Yes), the light quantity parameter selecting unit 43 reads the selected light quantity parameter table from the light quantity parameter table recording unit 45a (Step S2).

For example, when the operator performs observation using bright illumination like bright field microscopy or coarse adjustment of the quantity of light, the operator selects the light quantity parameter table 1 having a large unit manipulation amount, through the light quantity parameter table selecting button 55a. In this case, when the operator presses down the light quantity adjusting button 52 once, the quantity of light is increased or decreased by 100.

On the contrary, when the operator performs observation using dark illumination like dark field microscopy or fine adjustment of the quantity of light, the operator selects the light quantity parameter table 5 having a small unit manipulation amount, through the light quantity parameter table selecting button 55a. In this case, when the operator presses down the light quantity adjusting button 52 once, the quantity of light is increased or decreased by 20.

Thereafter, the operator performs observation of the specimen S while adjusting the light quantity of illumination light as appropriate by using the light quantity adjusting button 52 (Step S3).

The control unit 44 then determines whether or not an instruction to instruct the observation to be ended has been input (Step S4).

If the control unit 44 determines that an instruction to instruct the observation to be ended has been input (Step S4; Yes), the observation is ended. On the contrary, if the control unit 44 determines that an instruction to instruct the observation to be ended has not been input (Step S4; No), the processing is returned to Step S1 and continued.

If, at Step S1, the control unit 44 determines that a light quantity parameter table has not been selected (Step S1; No), the processing at Step S1 is executed repeatedly.

As described above, according to the first embodiment, by an operator selecting a light quantity parameter table correspondingly to an observation condition, a unit manipulation amount suitable for the observation condition is adopted. As a result, the operator is able to adjust the quantity of light by the unit manipulation amount corresponding to the observation condition, and thus operability in the adjustment of the quantity of light is improved.

Second Embodiment

A configuration of a microscope according to a second embodiment may be the same as that of the microscope 1 illustrated in FIG. 1, and thus description thereof will be omitted as appropriate. Processing in a controller 4 of a microscope 1 according to the second embodiment is different from that according to the first embodiment.

The light quantity parameter selecting unit 43 selects a light quantity parameter table having a maximum value closest to a light quantity of illumination light at a time point when the exposure time reaches the minimum as a result of the light source control unit 44a increasing the light quantity of illumination light.

Figure 5:
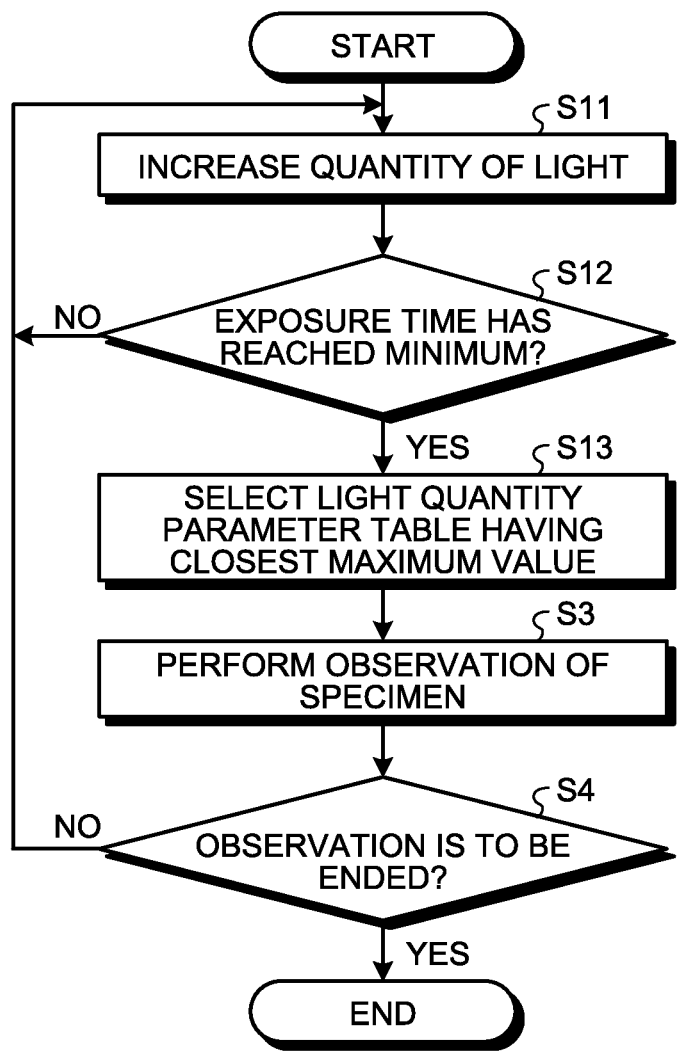
FIG. 5 is a flow chart illustrating an outline of processing upon observation of a specimen by use of a microscope according to a second embodiment.

FIG. 5 is a flow chart illustrating an outline of processing upon observation of a specimen by use of a microscope according to the second embodiment. As illustrated in FIG. 5, an operator increases the light quantity of illumination light by pressing down the light quantity increasing button 52a of the light quantity adjusting button 52 (Step S11). As the light quantity of illumination light is increased, the exposure time control unit 42 reduces the exposure time according to the quantity of light.

Subsequently, the control unit 44 determines whether or not the exposure time has reached the minimum (Step S12). If the control unit 44 determines that the exposure time has not reached the minimum (Step S12; No), the control unit 44 repeats this processing.

If the control unit 44 determines that the exposure time has reached the minimum (Step S12; Yes), the light quantity parameter selecting unit 43 selects a light quantity parameter table having a maximum value closest to the quantity of light at that time point, from the light quantity parameter tables 1 to 5 (Step S13).

For example, if the quantity of light at the time point when the exposure time reaches the minimum is 8500, the light quantity parameter selecting unit 43 selects the light quantity parameter table 2 having a maximum value closest to the quantity of light at that time point, since the maximum value in the light quantity parameter table 2 is 8000 in FIG. 2.

Thereafter, similarly to the first embodiment, observation of the specimen S is performed with the quantity of light desired (Step S3), the ending determination at Step S4 is performed, and the processing is continued or ended.

According to the second embodiment, since an optimum light quantity parameter table is selected in consideration of the exposure time, a more appropriate light quantity parameter table is able to be selected. According to the second embodiment, since the quantity of light where the exposure time is minimized serves as a reference, illumination light is able to be made sufficiently bright, and is prevented from becoming too bright more than necessary. By setting the quantity of light to be suitable for observation, the S/N ratio and the image quality are improved.

Detected according to the above described second embodiment is the quantity of light where the exposure time reaches the minimum by the operator pressing down the light quantity increasing button 52a manually, but the detection is not limited to this example. The light source control unit 44a may gradually increase the quantity of light automatically, and detect the quantity of light where the exposure time reaches the minimum. In this case, the labor of the operator pressing down the light quantity increasing button 52a is able to be eliminated.

Third Embodiment

Figure 6:
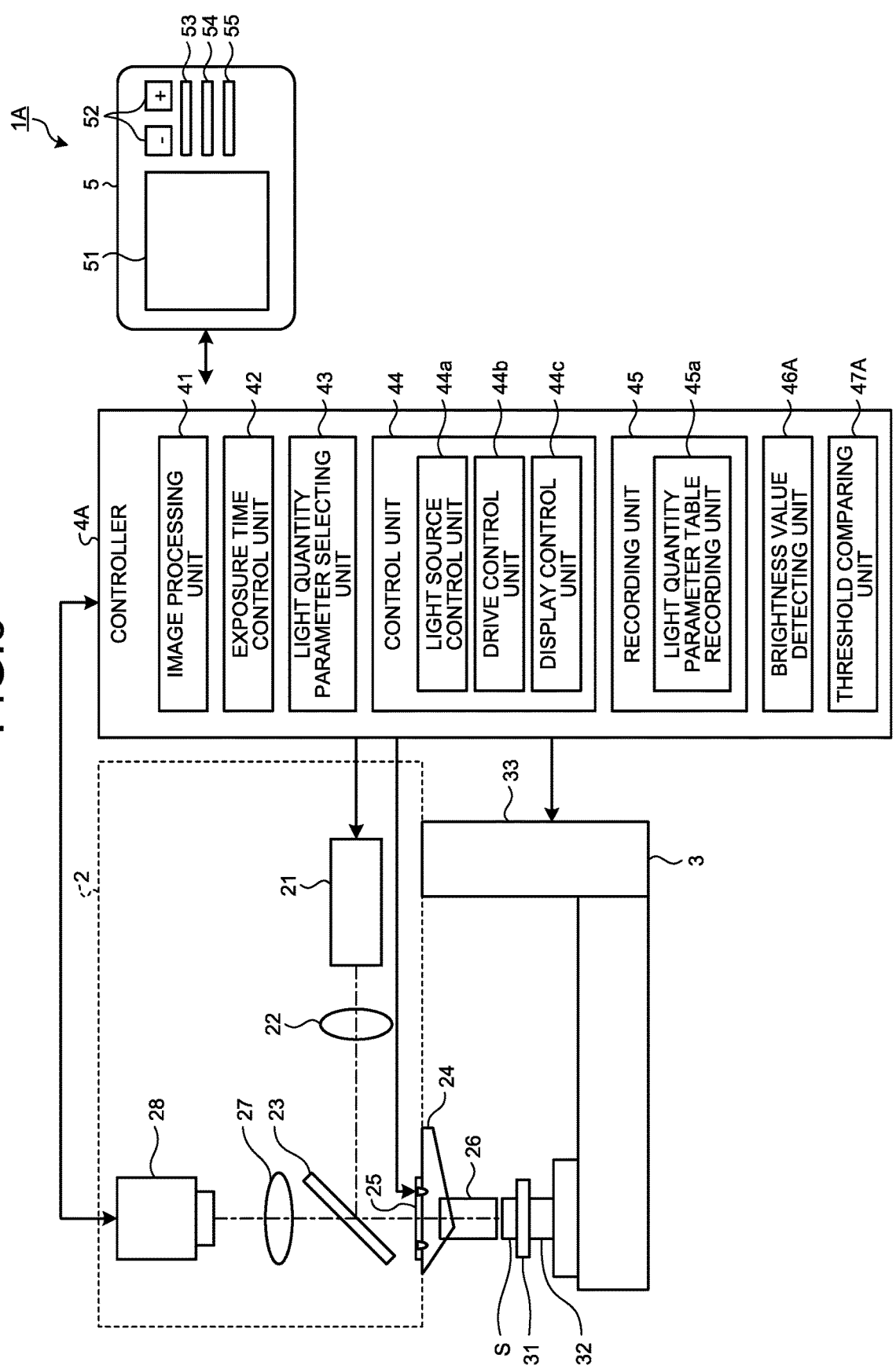
FIG. 6 is a block diagram schematically illustrating a functional configuration of a microscope according to a third embodiment.

FIG. 6 is a block diagram schematically illustrating a functional configuration of a microscope according to a third embodiment. As illustrated in FIG. 6, a controller 4A of a microscope 1A according to the third embodiment includes a brightness value detecting unit 46A and a threshold comparing unit 47A.

The brightness value detecting unit 46A detects a brightness value in an image captured by the imaging unit 28. Specifically, the brightness value detecting unit 46A calculates a brightness value that is an average value of brightness values of pixels in the image captured by the imaging unit 28.

The threshold comparing unit 47A performs comparison of whether or not the amount of change in the brightness value when the light source control unit 44a increases or decreases the quantity of light according to the magnitude of the unit manipulation amount is less than a threshold.

The light quantity parameter selecting unit 43 selects a light quantity parameter table from the light quantity parameter tables 1 to 5, according to a result of the comparison performed by the threshold comparing unit 47A.

Figure 7:
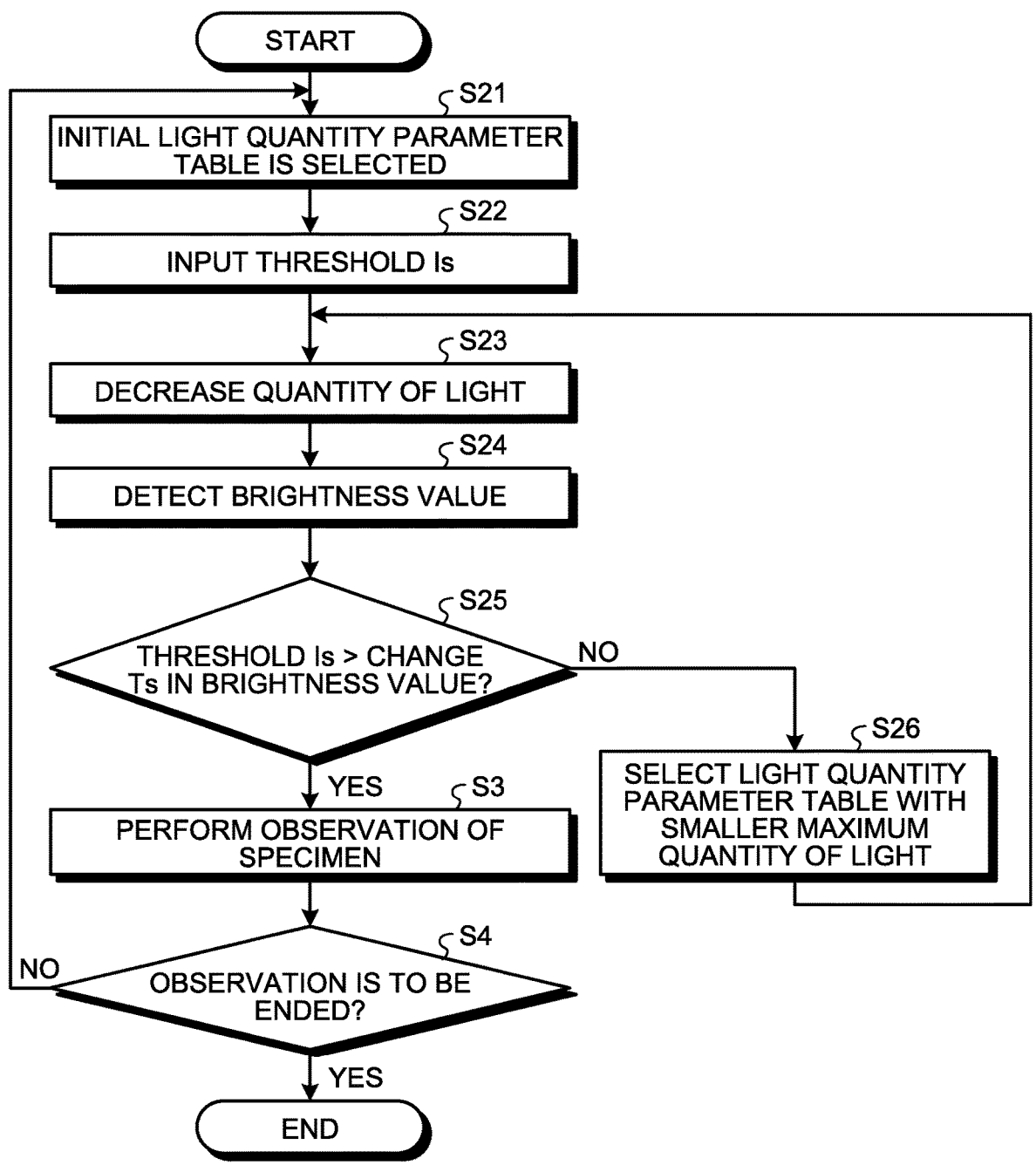
FIG. 7 is a flow chart illustrating an outline of processing upon observation of a specimen by use of the microscope according to the third embodiment.

FIG. 7 is a flow chart illustrating an outline of processing upon observation of a specimen by use of a microscope according to the third embodiment. As illustrated in FIG. 7, the control unit 44 selects an initially set light quantity parameter table from the light quantity parameter tables 1 to 5 (Step S21). It is assumed herein that the light quantity parameter table 1 is selected at Step S21. However, an operator may select the initial light quantity parameter table from the light quantity parameter tables 1 to 5.

Subsequently, the operator inputs a threshold Is (Step S22). Specifically, by using an input device, such as a keyboard, the operator inputs the threshold Is to be used for selection of a light quantity parameter table. It is assumed herein that the threshold Is=900.

Thereafter, by pressing down the light quantity decreasing button 52b, the operator decreases the quantity of light (Step S23). Because the light quantity parameter table 1 has been selected, the unit manipulation amount is 100, and when the light quantity decreasing button 52b is pressed down, the light source control unit 44a decreases the quantity of illumination light by 100.

The brightness value detecting unit 46A then detects a brightness value of an image captured by the imaging unit 28 (Step S24). Furthermore, the control unit 44 compares the calculated brightness value with a brightness value at the time before the light quantity increasing button 52a was pressed, and calculates a brightness value change amount Ts. It is assumed herein that the brightness value change amount Ts=1000.

Subsequently, the threshold comparing unit 47A determines whether or not a relation, the threshold Is>the brightness value change amount Ts, is satisfied (Step S25). As described above, since the brightness value change amount Ts (1000) is larger than the threshold Is (900), the threshold comparing unit 47A determines that the relation, the threshold Is>the brightness value change amount Ts, is not satisfied (Step S25; No).

The control unit 44 then selects the light quantity parameter table 2 that is smaller in the maximum quantity of light than the light quantity parameter table 1 (Step S26).

Thereafter, the processing is returned to Step S23, and by pressing down the light quantity decreasing button 52b, the operator decreases the quantity of light (Step S23). Because the light quantity parameter table 2 has been selected, the unit manipulation amount is 80, and when the light quantity decreasing button 52b is pressed down, the light source control unit 44a decreases the light quantity of illumination light by 80.

The brightness value detecting unit 46A then detects a brightness value of an image captured by the imaging unit 28 (Step S24). Furthermore, the control unit 44 compares the calculated brightness value with a brightness value at the time before the light quantity increasing button 52a was pressed down, and calculates a brightness value change amount Ts. It is assumed herein that this brightness value change amount Ts=800.

Subsequently, the threshold comparing unit 47A determines whether or not the relation, the threshold Is>the brightness value change amount Ts, is satisfied (Step S25). As described above, since the brightness value change amount Ts (800) is less than the threshold Is (900), the threshold comparing unit 47A determines that the relation, the threshold Is>the brightness value change amount Ts, is satisfied (Step S25; Yes).

Thereafter, similarly to the first embodiment, observation of the specimen S with the quantity of light desired is performed (Step S3), the ending determination at Step S4 is performed, and the processing is continued or ended.

According to the third embodiment, since a light quantity parameter table is selected according to a threshold Is and a brightness value change amount Ts input by an operator, a light quantity parameter table having an appropriate unit manipulation amount is selected and operability in adjustment of the quantity of light is improved. For example, if an operator sets a sufficiently small value as a threshold Is, the change in the quantity of light upon manipulation of the light quantity adjusting button 52 is sufficiently small, and thus fine adjustment of the quantity of light is facilitated.

With respect to the third embodiment, the example where the operator presses down the light quantity decreasing button 52b at Step S23 has been described above, but the third embodiment is not limited to this example. For example, the control unit 44 may automatically decrease the quantity of light according to a selected light quantity parameter table. Furthermore, until the threshold comparing unit 47A determines that the relation, the threshold Is>the brightness value change amount Ts, is satisfied, the control unit 44 may repeatedly decrease the quantity of light automatically. In this case, since an appropriate light quantity parameter table is automatically selected, the burden on the operator is able to be reduced further.

Fourth Embodiment

Figure 8:
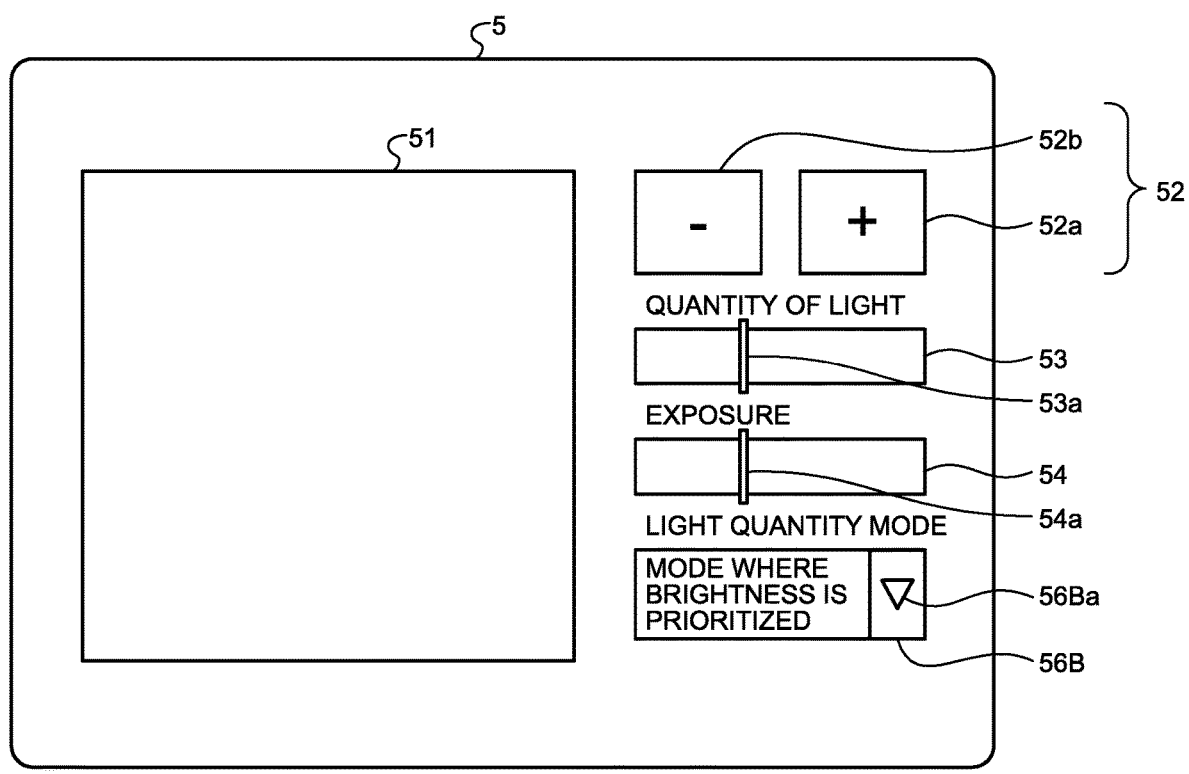
FIG. 8 is a diagram illustrating an example of a screen displayed on a display unit according to a fourth embodiment.

FIG. 8 is a diagram illustrating an example of a screen displayed on a display unit according to a fourth embodiment. As illustrated in FIG. 8, a display unit 5 has a light quantity mode selecting section 56B displayed thereon.

The light quantity mode selecting section 56B includes a light quantity mode selecting button 56Ba that receives input of an instruction to select a light quantity mode from an operator. When the light quantity mode selecting button 56Ba is pressed down, "mode where brightness is prioritized" and "mode where sensitivity is prioritized" are displayed. The operator selects a desired light quantity mode from the displayed "mode where brightness is prioritized" and "mode where sensitivity is prioritized". Thereafter, the selected light quantity mode is displayed in the light quantity mode selecting section 56B.

If the mode where brightness is prioritized is selected, the light source control unit 44a selects a light quantity parameter table having a maximum value closest to a light quantity of illumination light at a time point when the exposure time reaches the minimum as a result of the light source control unit 44a gradually increasing the light quantity of illumination light. On the contrary, if the mode where sensitivity is prioritized is selected, the light source control unit 44a selects one light quantity parameter table from the light quantity parameter tables 1 to 5, according to a result of the comparison performed by the threshold comparing unit 47A.

That is, if the mode where brightness is prioritized is selected, the light source control unit 44a performs the above described processing according to the second embodiment, and if the mode where sensitivity is prioritized is selected, the light source control unit 44a performs the above described processing according to the third embodiment. As a result, if the mode where brightness is prioritized is selected, the quantity of light is gradually increased, and an appropriate light quantity parameter table is selected so as to enable observation in the brightest state. Furthermore, if the mode where sensitivity is prioritized is selected, setting a sufficiently small value as a threshold Is facilitates fine adjustment of the light quantity.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnified observation apparatus, comprising:
an observation unit including: a light source configured to irradiate a specimen with illumination light; and an imaging unit configured to form an image of reflected light from the specimen;
a light quantity parameter table recording unit configured to store plural light quantity parameter tables therein, each of the plural light quantity parameter tables including: a minimum value and a maximum value of light quantity of the illumination light; and a unit manipulation amount obtained by division of an interval between the minimum value and the maximum value by a predetermined division number, maximum values in the plural light quantity parameter tables being different from one another;
a light quantity parameter selecting unit configured to select one light quantity parameter table from the plural light quantity parameter tables; and
a light source control unit configured to increase or decreases light quantity of the illumination light, correspondingly to magnitude of the unit manipulation amount in the light quantity parameter table selected by the light quantity parameter selecting unit, according to input of an instruction by an operator.

2. The magnified observation apparatus according to claim 1, wherein the observation unit is configured to perform observation by at least one observation method selected from the group of: bright field microscopy, dark field microscopy, MIX observation, differential interference contrast microscopy, polarized light microscopy, and oblique microscopy.

3. The magnified observation apparatus according to claim 1, further comprising:
an exposure time control unit configured to control an exposure time according to quantity of light, wherein the light quantity parameter selecting unit is configured to select a light quantity parameter table having a maximum value closest to a light quantity of illumination light at a time point when the exposure time reaches a minimum as a result of the light source control unit increasing the light quantity of the illumination light.

4. The magnified observation apparatus according to claim 1, further comprising:

a brightness value detecting unit configured to detect a brightness value in an image captured by the imaging unit; and a threshold comparing unit configured to perform comparison of whether or not an amount of change in the brightness value when the light source control unit increases or decreases the light quantity according to the magnitude of the unit manipulation amount is less than a threshold, wherein the light quantity parameter selecting unit is configured to select one light quantity parameter table from the plural light quantity parameter tables, according to a result of the comparison performed by the threshold comparing unit.

5. The magnified observation apparatus according to claim 1, further comprising:

an exposure time control unit configured to control an exposure time according to light quantity;

a brightness value detecting unit configured to detect a brightness value in an image captured by the imaging unit;

a threshold comparing unit configured to perform comparison of whether or not an amount of change in the brightness value when the light source control unit increases or decreases the light quantity according to the magnitude of the unit manipulation amount is less than a threshold; and a light quantity mode selecting unit configured to receive selection of a mode where brightness is prioritized or a mode where sensitivity is prioritized, wherein the light quantity parameter selecting unit is configured to select, when the mode where brightness is prioritized is selected, a light quantity parameter table having a maximum value closest to a light quantity of illumination light at a time point when the exposure time reaches a minimum as a result of the light source control unit increasing the light quantity of the illumination light, and select, when the mode where sensitivity is prioritized is selected, one light quantity parameter table from the plural light quantity parameter tables, according to a result of the comparison performed by the threshold comparing unit.

6. A magnified observation apparatus, comprising:

a light source configured to irradiate a specimen with illumination light;

an image sensor configured to form an image of reflected light from the specimen;

a memory configured to store plural light quantity parameter tables therein, each of the plural light quantity parameter tables including: a minimum value and a maximum value of light quantity of the illumination light; and a unit manipulation amount obtained by division of an interval between the minimum value and the maximum value by a predetermined division number, maximum values in the plural light quantity parameter tables being different from one another; and a processor comprising hardware, wherein the processor is configured to select one light quantity parameter table from the plural light quantity parameter tables, and increase or decrease the light quantity of the illumination light, correspondingly to magnitude of the unit manipulation amount in the selected light quantity parameter table, according to input of an instruction by an operator.

* * * * *